Figure 1:
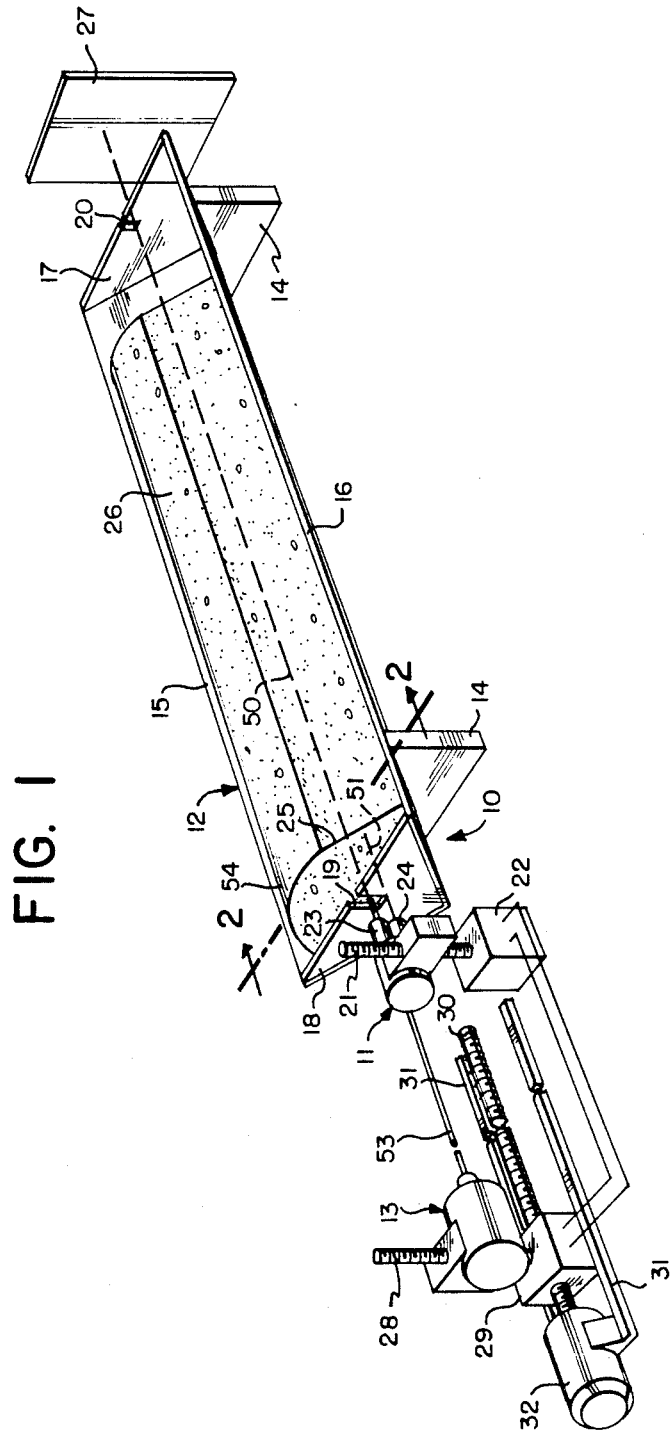

United States Patent
Broslaw

[15] 3,700,901
[45] Oct. 24, 1972

[54] APPARATUS FOR LOCATING THE GEOMETRIC CENTER OF A WORKPIECE

[72] Inventor: Edwin Broslaw, Lincoln Park, N.J.

[73] Assignee: Crest-Foam Corporation, Moonachie, N.J.

[22] Filed: Aug. 21, 1970

[21] Appl. No.: 65,788

[52] U.S. Cl............250/201, 250/202, 250/219 DR
[51] Int. Cl.........G01j 1/26, G01n 21/30, G05b 1/00
[58] Field of Search................250/201, 202, 219 RG

[56] References Cited

UNITED STATES PATENTS

| | | |
|---|---|---|
| 3,024,955 | 3/1962 | Powers, Jr............250/219 DR |
| 3,462,610 | 8/1969 | Frost....................250/219 DR |
| 3,466,514 | 9/1969 | Brunner et al. .....250/201 UX |
| 3,569,720 | 3/1971 | Fredriksen..........250/219 DR |

*Primary Examiner*—James W. Lawrence
*Assistant Examiner*—T. N. Grigsby
*Attorney*—Darby and Darby

[57] ABSTRACT

Apparatus for locating the geometric center of a workpiece includes a workpiece holder, a movably mounted photoelectric control element and a tool controlled by said control element and movable in the same axis as said control element.

9 Claims, 3 Drawing Figures

PATENTED OCT 24 1972

3,700,901

INVENTOR.
EDWIN BROWSLAW

BY Darby & Darby

ATTORNEYS

APPARATUS FOR LOCATING THE GEOMETRIC CENTER OF A WORKPIECE

This invention relates to electronically controlled tools and more particularly to an electronic apparatus for locating the geometric center of a workpiece. Further, this invention relates to a novel apparatus for automatically locating the geometric center of a workpiece and performing an operation upon said geometric center with a tool.

The geometric center of a workpiece is defined herein as the center of the largest circle that can be drawn on one facet of the workpiece.

In the manufacture of many common articles it is necessary as a primary operation to locate and work upon the geometric center of a workpiece. Locating the geometric center of a workpiece is of particular importance when it is desired to provide the largest circle possible on one facet of a particular workpiece.

The most common situation is one where it is desired to drill a hole or shaftway at the geometric center of a workpiece and use the aperture as a point for insertion of another tool to perform a further operation upon the workpiece. For example, in the milling of a round table leg from a rectangular workpiece, it is a common practice to clamp the square workpiece into a lathe at its geometric center and proceed to turn the workpiece down to the desired diameter. If the operator is to secure the maximum diameter leg from a rectangular workpiece, it is essential that the lathe be clamped at the geometric center of the rectangular workpiece.

As a further example, in the manufacture of continuous sheet or web material from a loaf-shaped block or bun of synthetic foamed product, the blocks or buns are peeled into continuous rolls. In order to peel or strip these buns, it is necessary to drill a shaftway lengthwise through their geometric centers. The bun is then rotated about this axis while being peeled or stripped by a specially constructed knife. If the shaftway is not placed at the geometric center of the bun, an excessive amount of material will be lost due to uneven cutting.

According to the present invention, an apparatus for locating the geometric center of a workpiece comprises a workpiece holder, a photosensitive control element mounted for reversible movement along a first axis, and a tool controlled by said photosensitive element, said tool being mounted for reversible movement along said first axis.

Thus, in locating the geometric center of a workpiece with this apparatus, the operator need not measure the workpiece prior to inserting it in the workpiece holder, nor is it necessary to adjust the machine for irregularities in the size of the workpiece. One embodiment of the invention includes means for measuring one dimension of the workpiece that is being drilled.

It is therefore a primary object of the present invention to provide a novel apparatus for locating the geometric center of a workpiece.

Another object of the present invention is to provide an automatic apparatus for locating the geometric center of a workpiece and performing an operation thereupon.

Figure 2:
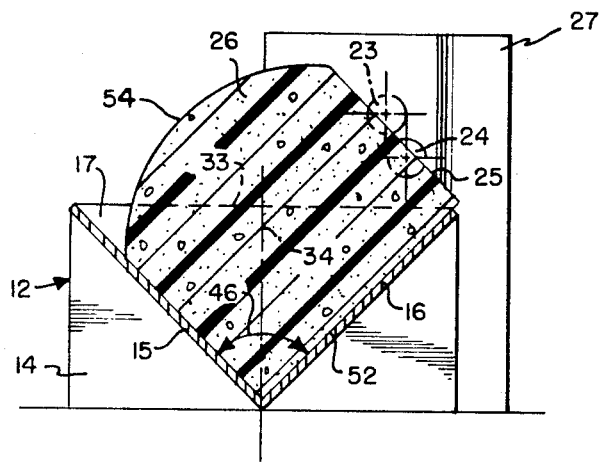
Figure 3:
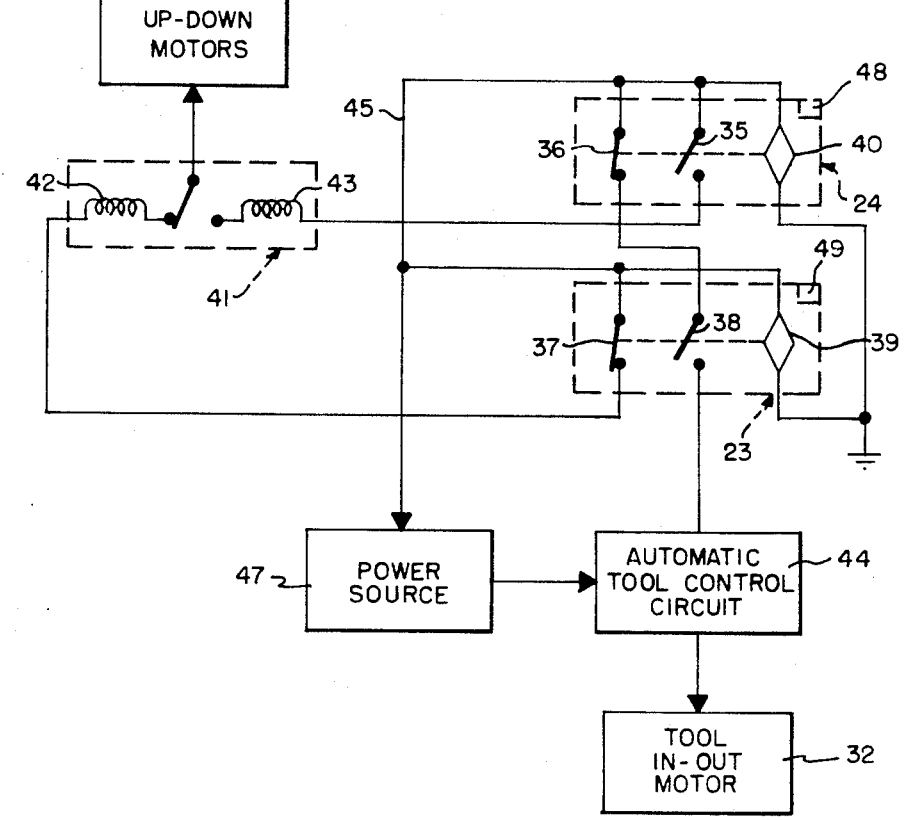

These and further objects and advantages of the invention will be more apparent upon reference to the following specification, claims and appended drawings, wherein:

FIG. 1 is a perspective view of an apparatus for locating the geometric center of a workpiece, FIG. 2 is a sectional view along the line 2—2 of FIG. 1, with the end wall removed, and FIG. 3 is a circuit diagram of the photosensitive control element of the present invention.

This invention will be described with reference to its use in the chemical processing industry and more specifically with reference to the drilling of foamed blocks or buns of flexible or rigid cellular foams based on polyesters or polyethers.

In the production of plastic foams and in particular polyurethane foams, the continuous processing method is commonly employed. In this method, the liquid ingredients of which the foam is comprised are metered onto a release paper moving along a conveyor. As the conveyor proceeds away from the metering station, the foam rises to form a continuous bun or block of flexible urethane foam. After cooling, the continuous block is cut into smaller buns which have the appearance of large loaves of bread, being formed in substantially rectangular cross section with a hemispheric crown or crust. The size of these buns can vary depending upon the end use of the foamed product.

In most cases, a shaftway is sunk lengthwise through the geometric center of the bun and used as the axis of rotation about which the bun is peeled or stripped into a continuous web of thin fabric-like material. Generally, there are small variations in the size of sequential buns coming off the conveyor on the same production run. Manually measuring, marking and positioning a bun for drilling and insertion of a lengthwise shaftway is a tedious and time-consuming operation. The apparatus of this invention automatically locates the geometric center on a bun of foamed material positioned in a workpiece holder and, having located the center, drills a lengthwise hole therein.

Referring to FIG. 1 of the drawings, the apparatus for locating the geometric center of a workpiece is generally indicated at 10 and comprises a photosensitive control element 11, a workpiece holder 12, and a tool 13.

The workpiece holder 12 is supported upon identical V-shaped legs 14 and comprises a V-shaped trough whose walls 15 and 16 are aligned at a 90° angle with one another. The trough has end walls 17 and 18 which are designed to hold a bun in fixed position while it is being drilled lengthwise. Notches 19 and 20 are provided in each of the respective end walls to accommodate a drill bit or boring tool. Although the workpiece holder for this embodiment of the invention is illustrated with solid end walls 17 and 18, it will be understood that these are not necessary for operation of this invention, and a bar arrangement, a grid, or no end wall at all may be employed, depending upon the nature of the workpiece and the operation to be performed upon its geometric center. Similarly, although a V-shaped workpiece holder is indicated in this embodiment of the invention, it will be understood that the shape of the workpiece holder can be varied depending upon the geometrical configuration of the workpiece in which the geometric center must be located.

Photosensitive control element 11 is movably mounted upon vertical screw 21, which can be reversibly rotated by drive member 22. As screw 21 is rotated in one direction, photosensitive control element 11 will rise vertically on the threaded portions of screw 21, and if the direction of rotation of screw 21 is reversed, control mechanism 11 will descend along the same screw threads.

Photosensitive control element 11 consists of upper and lower photoelectric elements 23 and 24.

Referring to FIG. 2, it will be seen that the upper and lower photoelectric elements which include suitable actinic light sources 48 and 49 are horizontally offset from one another a distance equal to approximately one-half the diameter of each photoelectric element. This offset distance is necessary to allow sufficient time for the switches in the control mechanism to follow the photosensitive circuit, and must be adjusted for optimum sensitivity for different workpiece holders.

The placement of the control mechanism 11 relative to the workpiece holder 12 is not critical; however, photoelectric elements 23 and 24 must be disposed such that they can pick some portion of an edge 25 of workpiece 26 which is parallel to wall 15 of workpiece holder 12, and that the photoelectric elements are aligned on the edge 25 while the tool 13 is zeroed on the geometric center of the first workpiece. It should be noted that the placement of the photoelectric elements will vary depending upon the shape of the workpiece. For example, when it is desired to locate the geometric center of a circular workpiece positioned in a suitable workpiece holder, the photoelectric elements should be mounted on the same screw as tool 13. Although the apparatus of the invention will automatically compensate for small variations in the width of individual workpieces, it should be noted that in the case of the illustrated workpiece 26, when the width of the workpiece varies to the extent that it is greater than the height of the workpiece (measured from the top of the crown 54 to the base 52), the workpiece 26 should be seated in workpiece holder 12 such that photoelectric elements 23 and 24 will pick up some portion of the edge of crown 51, rather than the edge 25.

Photoelectric elements 23 and 24 transmit narrow beams of actinic light 50 and 51 respectively, which are reflected back to actinic light sensors in each respective photoelectric element by reflector 27 when these elements are not obscured by side walls 17 and 18 or workpiece 26. The ability of each photoelectric element to receive a portion of its transmitted actinic light beam reflected from reflector 27 is a significant factor in operating the apparatus of this invention, as will be explained later.

Tool 13 is operable in response and in conjunction with photosensitive control element 11. The function of tool 13 is not limited to any particular operation, and it can be a drill, boring device, marking apparatus or stamp. In any case, it is the function of tool 13 to indicate the exact geometric center of workpiece 26 in workpiece holder 12.

Tool 13 is movably mounted on rotatable screw 28, which is in turn reversibly driven by drive member 29, which is operated simultaneously with drive member 22. Drive member 22 operates the drive screw 21 upon which photosensitive control element 11 rides. Upon activation, drive members 22 and 29 are arranged to rotate screws 28 and 21 in the same relative direction, such that when photosensitive control element 11 is ascending screw 21, tool 13 will be ascending screw 28. Screws 28 and 21 have different thread ratios, so that although drive members 22 and 29 rotate their respective screws at the same speed, the photosensitive control element 11 will move through twice the vertical distance as tool 13. As will be apparent, once photosensitive control element 11 and tool 13 have been mounted and indexed to one another and the edge 25 of workpiece 26, they will continue to ascend and descend their respective screws in a two-to-one ratio, with the photosensitive element 11 moving twice the vertical distance of tool 13 for an equivalent period of operation of drive members 22 and 29.

Tool 13 and its associated screw and drive members are additionally mounted for movement forward and backwards on screw 30 and tracks 31. Screw 30 is in turn driven by drive member 32 which will generally be an electric motor similar to drive members 29 and 22. It is essential that the bit or point 53 of tool 13 be permanently mounted so that its vertical movement will be along the center line 34 bisecting end wall top surface 33 and angle 46 formed at the intersection of side walls 15 and 16. This line is easily determined with a single measurement, and tool 13 along with its accompanying screw and rail apparatus can be permanently mounted for vertical movement along this center line 34.

Drive members 22, 29 and 32 are all linked to photosensitive control element 11 via cables 35.

In operation, a bun or loaf-shaped block of synthetic foam material is seated in workpiece holder 12, as represented in FIGS. 1 and 2. The operator initiates the cycle with a switch or other suitable control means for connecting photosensitive control element 11 and its associated drive members to an electrical power source. Photosensitive control element 11 and tool 13 will begin moving in a vertical direction, with the tool 13 moving only one half the distance of control element 11, for a given period of operation. At the point where the upper photoelectric element 23 is receiving a portion of its transmitted light beam from reflector 27, and lower photoelectric element 24 is not receiving actinic light from reflector 27 due to its position beneath an edge of workpiece 26, the tool 13 will be located. If a larger workpiece 26 is placed in workpiece holder 12, the photoelectric elements 23 and 24 will taxi up due to rotation of screw 21 by drive member 22, and similarly tool 13 will taxi in the same direction at twice the speed due to the rotation of screw 28 by drive member 29. It should be noted that it is not necessary to re-index tool 13 and photosensitive control element 11 after each operation, as the two-to-one movement ratio of these element remains constant after they are initially indexed before the apparatus is placed in operation.

When the upper photoelectric element 23 is not receiving actinic light from reflector 27, screw members 28 and 21 will be driven clockwise by drive members 22 and 29 thereby causing photosensitive element 11 and tool 13 to ascend to the point where upper photoelectric sensor 23 receives actinic light from reflector 27 whereupon drive members 22 and 29 are disconnected. Similarly, if lower photoelectric element 24 is receiving actinic light from reflector 27, screws 21 and 28 will be driven in counterclockwise direction by drive members 22 and 29, causing photosensitive element 11 and tool 13 to descend to the point where lower photoelectric element 24 is no longer receiving actinic light from reflector 27.

The operation of this apparatus will be more completely comprehended by reference to FIG. 3 which is a circuit diagram of the photosensitive control element 11.

In FIG. 3, photosensitive control element 11 is shown with its switches and elements positioned for activating drive elements 22 and 29 to rotate screws 21 and 28 in clockwise direction, thereby causing photosensitive element 11 and tool 13 to ascend. The main operative elements of control element 11 are upper photoelectric element 23 which controls the upward movement of tool 13 and control mechanism 11, and lower photoelectric element 24 which controls the downward movement of the same elements.

Photoelectric elements 23 and 24 each contain a pair of switches 35, 36 and 37, 38 respectively, in addition to actinic light sensors 39 and 40. As illustrated in FIG. 3, neither actinic light sensor is receiving actinic light from reflector 27, and therefore when the operator connects the apparatus to an appropriate power source 47, although actinic light sensors 39 and 40 will be activated, they will not change the condition of switches 35, 36, 37 or 38. Switch 37 will remain closed, thereby activating up-switch 42 in reversible magnetic relay. Upswitch 42 connects the windings of drive elements 22 and 29 such that screws 21 and 28 are rotated in a clockwise direction enabling photosensitive control element 11 and tool 13 to ascend.

At the point where upper photosensitive element 23 detects actinic light via actinic light sensor 39, the contacts on switch 37 will open and those on switch 38 will close. The switch condition in lower photoelectric element 24 will not change since it is below the edge of the workpiece and therefore not receiving actinic light from reflector 27. This situation will ideally occur when the bit of tool 13 is coaxially aligned with the geometric center of workpiece 26. Since the positions of switches 37 and 38 are now reversed and switch 38 is closed, a complete circuit is made through switches 36 and 38 to automatic tool control circuit 44 which activates drive member 32 to rotate screw 30 and simultaneously to activate tool 13 which will drill or mark workpiece 26. The automatic tool control circuit 44 will then withdraw tool 13 until it comes to rest at its starting position, and is prepared to cycle again.

When both photoelectric elements 23 and 24 are receiving actinic light via actinic light sensors 40 and 39, switches 35 and 38 are closed, while switches 36 and 37 are open. This condition would occur when actinic light sensors 39 and 40 in photosensitive control element 11 were located above the surface of workpiece 26. As is apparent, the only complete circuit would be made via main cable 45 through switch 35 to the down-switch 43 of reversible magnetic relay 41. In this condition, switch 43 would connect the windings of drive members 22 and 29 in such manner that screws 21 and 28 would rotate in a counterclockwise direction, thereby causing photosensitive element 11 and tool 13 to descend. At the point where photoelectric element 24 was below one edge of workpiece 26, and actinic light sensor 40 was no longer receiving actinic light from reflector 27, switch 35 would open and switch 36 would close, thereby completing the circuit to automatic drill apparatus 44. Upper photoelectric element 23 would remain in the same state with switch 38 closed and switch 37 open, as light sensor 39 would still be receiving actinic light from reflector 27.

Although the apparatus of this invention has been described with regard to locating and drilling a shaftway through the geometric center of a loaf of foam material, it is not intended to be limited in scope thereby. As will be obvious to those skilled in the art, the components of this invention can be varied to enable an operator to locate and perform operations upon the geometric centers of a great variety of workpiece shapes. By varying the shape of the workpiece holder, the positioning of photosensitive element 11 and its associated screw, or the type of tool 13, it will be possible to locate the geometric centers of a variety of shapes and materials.

What is claimed is:

1. Apparatus for locating the geometric center of a workpiece having a cross-section containing at least two substantially right angles comprising a workpiece holder adapted to hold the workpiece in a preselected position, means for sensing at least one edge of the workpiece mounted for reversible movement along a first vertical axis, a marking tool mounted for reversible movement, proportional to the movement of the means for sensing, along a second vertical axis bisecting one of the 90° angles of the workpiece, means for controlling the reversible movement of the marking tool and the means for sensing, means for halting the marking tool in a position in response to the detection of the edge of the workpiece by the sensing means and means for placing the marking tool in contact with the workpiece.

2. Apparatus for locating the geometric center of a workpiece as recited in claim 1 wherein the marking tool comprises an electric drill.

3. The apparatus of claim 1 in which the workpiece is substantially a rectangular solid.

4. Apparatus for locating the geometric center of a workpiece as recited in claim 1 wherein the means for sensing at least one edge of the workpiece comprises at least one photosensitive element.

5. The apparatus of claim 4 in which the workpiece is positioned with one of its longitudinal sides at a 45° angle with the first vertical axis.

6. Apparatus for locating the geometric center of a workpiece as recited in claim 4 wherein the photosensitive element further includes a source of actinic light.

7. Apparatus for locating the geometric center of a workpiece as recited in claim 6 wherein said workpiece holder is a V-shaped trough, and having a first photosensitive element mounted above and horizontally offset from a second photosensitive element.

8. Apparatus for locating the geometric center of a workpiece as recited in claim 6 wherein the first vertical axis comprises a vertical screw and a reversible motor for driving the screw.

9. Apparatus for locating the geometric center of a workpiece as recited in claim 8 wherein the second vertical axis comprises a second vertical screw having twice as many threads per unit length as the first vertical screw.

* * * * *